US008019645B2

(12) United States Patent
Mattingly et al.

(10) Patent No.: US 8,019,645 B2
(45) Date of Patent: Sep. 13, 2011

(54) BUSINESS METHOD FOR PROMOTING GOODS AND SERVICES OF PROVIDERS

(75) Inventors: Brian Mattingly, Charlotte, NC (US); Edward Joseph Fain, Woodstock, GA (US)

(73) Assignee: Welcomemat Services, Inc., Charlotte, NC (US)

( * ) Notice: Subject to any disclaimer, the term of this patent is extended or adjusted under 35 U.S.C. 154(b) by 0 days.

(21) Appl. No.: 12/660,980

(22) Filed: Mar. 9, 2010

(65) Prior Publication Data
US 2010/0174604 A1 Jul. 8, 2010

Related U.S. Application Data

(63) Continuation of application No. 11/472,882, filed on Jun. 22, 2006, now abandoned, and a continuation-in-part of application No. 10/932,599, filed on Sep. 2, 2004, now abandoned.

(60) Provisional application No. 60/713,135, filed on Aug. 31, 2005.

(51) Int. Cl.
*G06Q 30/00* (2006.01)
*G05B 19/418* (2006.01)
(52) U.S. Cl. .............. 705/14.41; 705/406; 705/407; 705/10; 235/375
(58) Field of Classification Search ............... 235/375; 705/406, 407, 10
See application file for complete search history.

(56) References Cited

U.S. PATENT DOCUMENTS

| 4,752,675 | A | * | 6/1988 | Zetmeir .................. 235/375 |
| 5,710,886 | A | * | 1/1998 | Christensen et al. ...... 705/14.26 |
| 6,882,442 | B2 | | 6/2003 | Roberts |
| 6,850,209 | B2 | | 2/2005 | Mankins et al. |
| 6,868,389 | B1 | * | 3/2005 | Wilkins et al. .................. 705/10 |
| 2002/0026359 | A1 | | 2/2002 | Long et al. |
| 2005/0114197 | A1 | * | 5/2005 | Bell .................. 705/10 |
| 2006/0100912 | A1 | | 5/2006 | Kumar et al. |

OTHER PUBLICATIONS

MKT Direct Marketing: Age-old way to define markets—lifestage data is a valuable tool for marketers. Ken Gofton. p. 31, Jul. 15, 1999.*
Claritas, Inc., Prizm NE Methodology Summary, Claritas brochure, entire brochure, 2004.

* cited by examiner

*Primary Examiner* — John G. Weiss
*Assistant Examiner* — Victoria Vanderhorst
(74) *Attorney, Agent, or Firm* — Schwartz Law Firm, P.C.

(57) ABSTRACT

A business method for promoting goods and services of providers includes the steps of designating a group of targeted recipients, and storing demographics information of each recipient in an electronic database. A plurality of direct mail items including provider promotions is generated, and each marked with a machine-readable ID code unique to each of the recipients. The direct mail items are sorted by their respective ID codes into cooperative mail packages, each mail package containing multiple items with common ID codes. The mail packages are then forwarded to respective recipients. After redemption of a direct mail item by a recipient, the ID code is read and electronically linked with the recipient's demographics information contained in the electronic database. A report is generated based on the direct mail items redeemed. The report may include a geographic map which plots respective locations of recipients, and/or a listing of receipts grouped into a plurality of demographics segments.

1 Claim, 4 Drawing Sheets

BUSINESS METHOD FOR PROMOTING GOODS AND SERVICES OF PROVIDERS

TECHNICAL FIELD AND BACKGROUND OF THE INVENTION

This invention relates to a business method for promoting goods and services of providers, such as business owners, through the distribution and tracking of direct mail promotional items. The invention utilizes machine-readable codes applied to the items. When the items are redeemed and the codes scanned, useful information concerning the recipient of the item is acquired and reported. The invention reveals trends relevant to particular customer groups, markets and industries, provides valuable demographics information to business owners, and generates customer and prospects lists for future mailings.

Unlike other direct mail promotions, the present invention designates a targeted group of recipients and preselects multiple items highly relevant to the group for mailing in a bundled cooperative mail package. For example, if the targeted group is first-time parents, each package may include paper coupons for a baby furniture store, diapers and wipes, daycare and pediatrician services, baby formula, and the like. Some recipients in the group may receive more or less items, or even different but related items based on demographics and other valuable information obtained in previous mailings to similarly situated recipients. Similarly, the invention may also generate secondary mailings to recipients based on past item redemptions. For example, if a recipient in a direct mailing which targets new residents redeems an item at a furniture store to purchase a baby's crib, the secondary mailing to that recipient may include direct mail items relating to baby formula, diapers, and the like.

For redeemed items, the invention has reporting features especially useful to business owners and other item providers. For example, the invention may utilize geographic mapping and/or customer segmentation to promote more effective market targeting. Customer segmentation is the subdivision of a market into discrete customer groups that share certain characteristics. Customer segmentation can be a powerful means to identify unmet customer needs. Once the needs are identified, companies can then outperform the competition by developing uniquely appealing products and services. Customer segmentation is most effective when a company tailors offerings to segments that are the most profitable and serves them with distinct competitive advantages. This prioritization can help companies develop marketing campaigns and pricing strategies to extract maximum value from both high- and low-profit customers. A company can use Customer segmentation as the principal basis for allocating resources to product development, marketing, service and delivery programs.

Customer Segmentation typically involves one or more of the following:

(a) dividing the market into meaningful and measurable segments according to customers' needs, their past behaviors or their demographic profiles;

(b) determining the profit potential of each segment by analyzing the revenue and cost impacts of serving each segment;

(c) targeting segments according to their profit potential and the company's ability to serve them in a proprietary way;

(d) investing resources to tailor product, service, marketing and distribution programs to match the needs of each target segment; and (e) measuring performance of each segment, and adjusting the segmentation approach over time as market conditions change decision making throughout the organization.

In the context of the present invention, customer segmentation is especially useful for prioritizing new product development efforts, developing customized marketing programs, choosing specific product features, establishing appropriate service options, designing an optimal distribution strategy, and/or determining appropriate product pricing.

SUMMARY OF INVENTION

Therefore, it is an object of the invention to provide a business method for promoting goods and services of providers through the distribution and tracking of direct mail items.

It is another object of the invention to provide a business method which utilizes cooperative mail packages which are precisely customized for each recipient with certain direct mail items most likely to be redeemed.

It is another object of the invention to provide a business method which conveniently and efficiently tracks the redemption of direct mail items.

It is another object of the invention to provide a business method which promotes efficient use of provider advertizing.

It is another object of the invention to provide a business method which reveals trends relevant to particular customer groups, markets and industries.

It is another object of the invention to provide a business method which conveys valuable customer demographics information to business owners.

It is another object of the invention to provide a business method which includes geographically plotting a customer base utilizing electronic mapping software.

It is another object of the invention to provide a business method which utilizes customer segmentation.

These and other objects of the present invention are achieved in the preferred embodiments disclosed below by providing a business method for promoting goods and services of providers. The business method includes the steps of designating a group of targeted recipients, and storing demographics information of each recipient in an electronic database. A plurality of direct mail items including provider promotions is generated, and each marked with a machine-readable ID code unique to each of the recipients. The direct mail items are sorted by their respective ID codes into cooperative mail packages, each mail package containing multiple items with common ID codes. The mail packages are then forwarded to respective recipients. After redemption of a direct mail item by a recipient, the ID code is read and electronically linked with the recipient's demographics information contained in the electronic database. A report is generated based on the direct mail items redeemed. The report may include a geographic map which plots respective locations of recipients, and/or a listing of receipts grouped into a plurality of demographics segments.

The term "demographics information" is defined broadly herein and includes, but is not limited to, one or more of name, address, age, gender, presence of children, income level, and dwelling type.

The term "direct mail item" is also defined broadly as any written or electronic communication.

The term "cooperative mail package" refers to the assembly of multiple direct mail items into a single package. Preferably, the items are preselected based on certain anticipated needs or desires of recipients in a targeted group. For example, new home owners may desire coupons or gift certificates for a home improvement store, landscape nursery, window treatments, and the like.

According to another preferred embodiment of the invention, the mail packages are sorted based on the number of direct mail items contained in each package, such that each package in a sorted group has an equal number of direct mail items.

According to another preferred embodiment of the invention, the targeted group of recipients includes new residents having relocated within a zip code and/or from one zip code to another.

According to another preferred embodiment of the invention, the demographics information includes statistical data selected from a group consisting of address, age, gender, and income.

According to another preferred embodiment of the invention, the machine-readable ID code is standard bar coding.

According to another preferred embodiment of the invention, the method includes forwarding the mail packages to recipients via a postal service.

According to another preferred embodiment of the invention, the method includes forwarding the mail packages to recipients via electronic mail.

According to another preferred embodiment of the invention, the report includes a secondary mailing report containing demographics information for at least a portion of the targeted group for purposes of generating additional direct mail items.

According to another preferred embodiment of the invention, the report includes a trending report including a redemption ranking of direct mail items for goods and services classified by subject matter.

According to another preferred embodiment of the invention, the report includes demographics information for recipients redeeming the direct mail items.

According to another preferred embodiment of the invention, the method includes forwarding redeemed direct mail items to a clearinghouse for reading respective ID codes.

According to another preferred embodiment of the invention, the method includes surveying the recipient after the direct mail item is redeemed.

According to another preferred embodiment of the invention, the step of generating the direct mail items includes printing sheets of paper coupons, each sheet comprising first and second coupon sections.

According to another preferred embodiment of the invention, the method includes stacking the sheets such that the first coupon sections and the second coupon sections are arranged, respectively, in vertical registration.

According to another preferred embodiment of the invention, the method includes collating the coupons such that respective cooperative mail packages are assembled in sequence from coupons cut from the first coupon section of each stacked sheet, and after the first coupon sections are exhausted, from the second coupon section of each stacked sheet.

In another embodiment, the invention is a cooperative mail package containing multiple direct mail items comprising promotions designed for promoting goods and services of providers. The direct mail items include common machine-readable ID codes unique to an individual recipient. Each ID code is adapted for being electronically linked to recipient demographics information contained in an electronic database.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

The present invention is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be operative, enabling, and complete. Like numbers refer to like elements throughout. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described.

Broadly stated, the present business method designates a targeted group of consumers (referred to as "Recipients"), utilizes direct mail Items to promote goods and services of local businesses (referred to as "Providers"), marks the Items with machine-readable Barcode, forwards the Items in cooperative mail Packages to the Recipients, and tracks redemption of the Items for subsequent reporting. In one embodiment, the targeted Recipients are new residents—i.e., individuals and families who have relocated from one zip code to another. Other targeted groups may include, for example, new businesses, first-time parents, members of a particular organization or trade, or groups based on specific demographics criteria, such as age, income level, education, lifestyle, and the like. The direct mail Items may be coupons, gift certificates, discount sale notices, and other forms of advertizing. A System Administrator manages and coordinates each of the various steps indicated above and discussed in further detail below.

Figure 1:
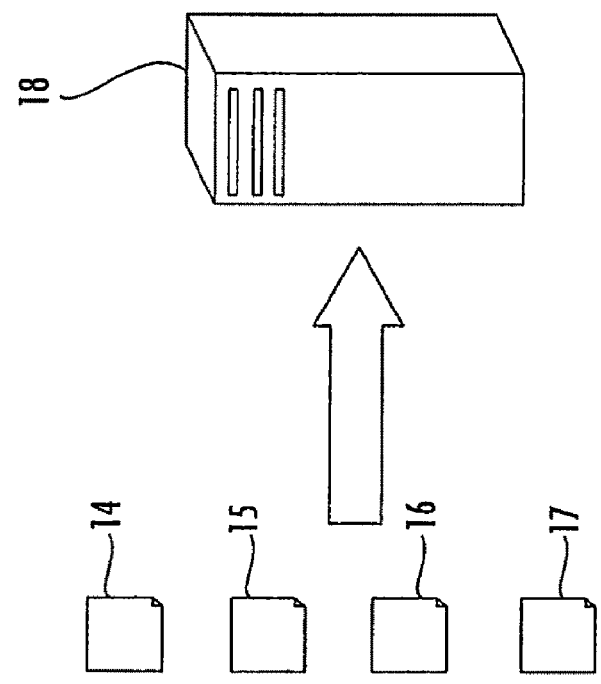
FIG. 1 is a flow diagram illustrating the initial steps of a business method according to one preferred embodiment of the present invention.
Figure 1:
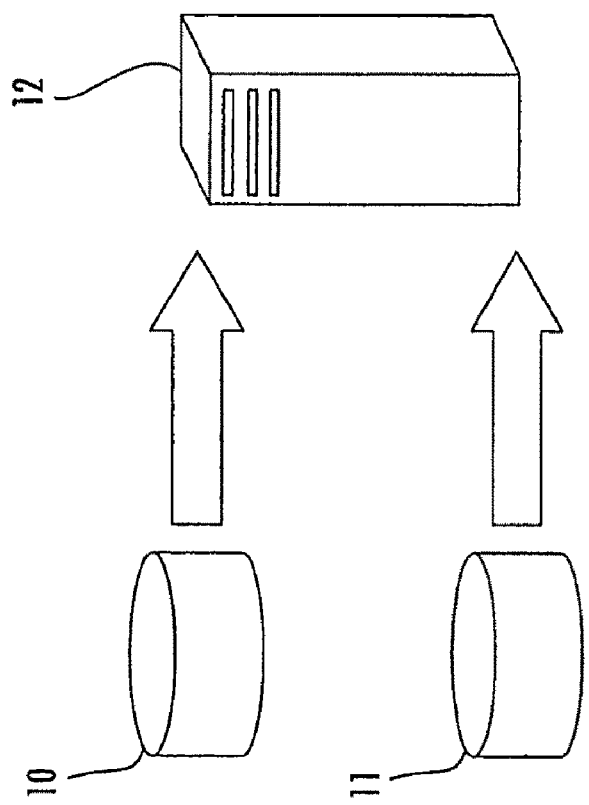

Referring to the flow diagram of FIG. 1, separate databases 10 and 11 are built containing information relevant to both the Providers and the Recipients. The Provider Database 10 stores business ID numbers, mailing zones, etc., and certain business account information used by the System Administrator. The Recipient Database 11 stores demographic information including names, addresses, ages, gender, income levels, etc. for each of the Recipients.

The Provider and Recipient Databases 10, 11 are merged together using a system application, indicated at 12. The merged data results in a single electronic Record for each Recipient. Each Record contains a certain number of (electronic) direct mail Items, and machine-readable barcode elements comprising unique ID numbers. The application 12 identifies the number of direct mail Items to be included in each Record, and merges all Records containing the same number of Items into a single Data File. Multiple Data Files 14, 15, 16, and 17 are shown in FIG. 1. The application 12 further generates summary reports which identify the number of direct mail Items in each Data File 14-17, the number of direct mail Items being mailed to various zip codes, and certain provider billing information, such as rate, discounts, etc. relevant to the System Administrator.

After generating the Data Files 14-17, a commercial postal sorting application 18 cleans and verifies the recipient addresses indicated in respective Records. Appropriate postal information is inserted into each Data File 14-17 so that maximum postage discounts are achieved for all direct mail Items. The postal-sorted Files are then pre-collated in two notional "cylinders"—one cylinder comprising material for occupying a top section of a printed item Sheet (described below), and the other cylinder comprising material for occupying the bottom section. Ultimately, the two cylinders generate a stack of printed item Sheets with the top and bottom sections containing respective direct mail Items. The Sheets are stacked in exact vertical registration for proper cutting and separation of the top and bottom sections. The recipient Records contain respective direct mail Items arranged in sequence starting from the top sections of the stacked item Sheets, and after the top sections are exhausted, from the bottom sections of the Sheets.

Figure 2:
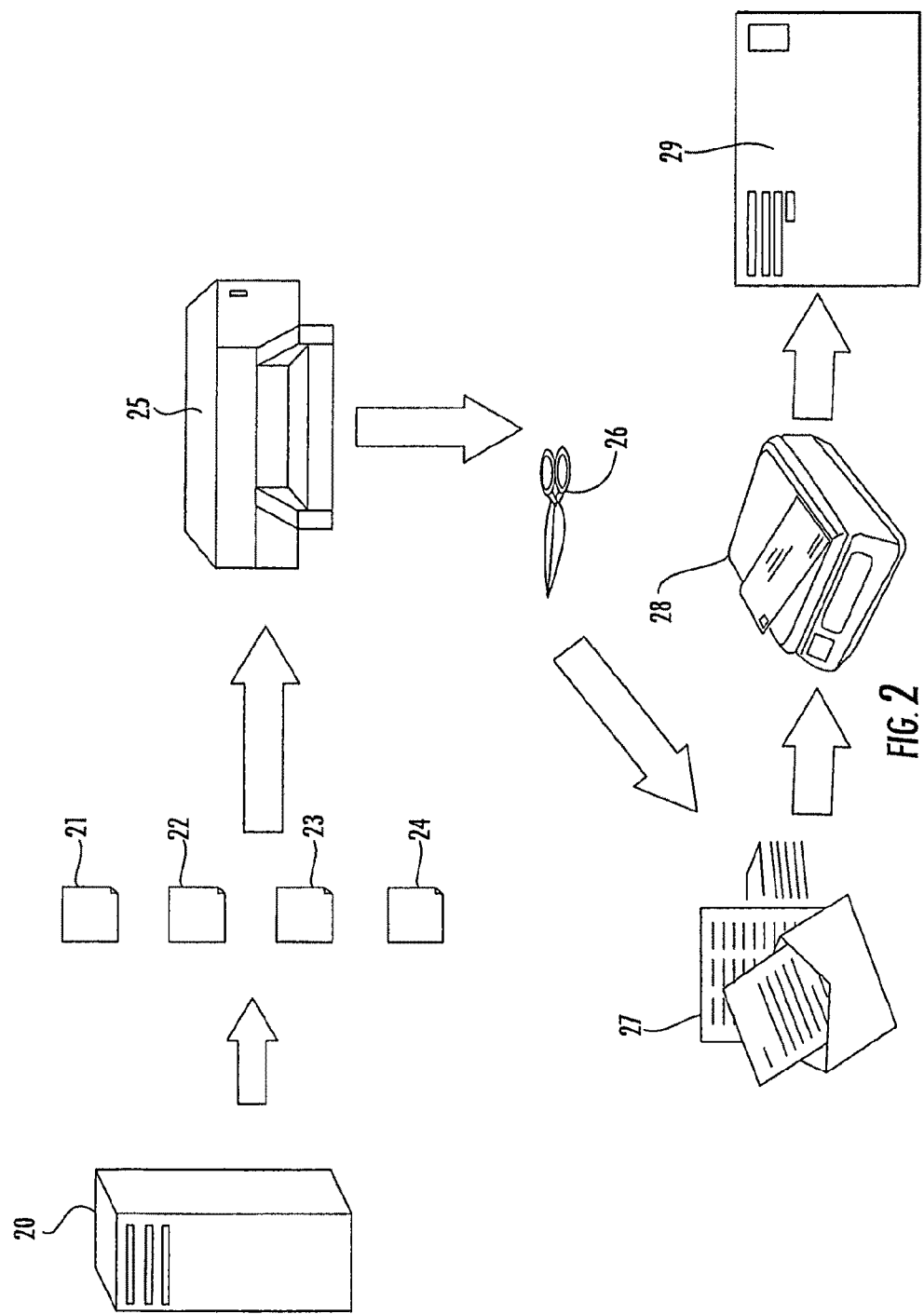
FIG. 2 is a continuation of the flow diagram provided in FIG. 1.

Referring to FIG. 2, once pre-collated, the Data Files are run through a commercial, variable data software program 20, such as Paris Software™ sold by Xerox, for formatting and graphics rules. This program 20 generates one direct mail Item in the top section of the item Sheet and a second Item in the bottom section of the item Sheet, as previously described. The unique recipient Barcode is applied to both sections. The program 20 converts the Data Files to Output Files 21, 22, 23, and 24 in Adobe Postscript® format ready for printing. The Output Files 21-24 are printed, as indicated at 25, on 8.5×11-inch paper item Sheets stacked in the exact sequence of printing. The item Sheets are then cut in half, as indicated at 26, to separate the direct mail Items printed in respective top and bottom sections. The direct mail Items of each Record are placed into a single envelope, as indicated at 27, the enveloped weighed and metered, as indicated at 28, and then forwarded to the Recipient in a cooperative mail Package, indicated at 29.

Figure 3:
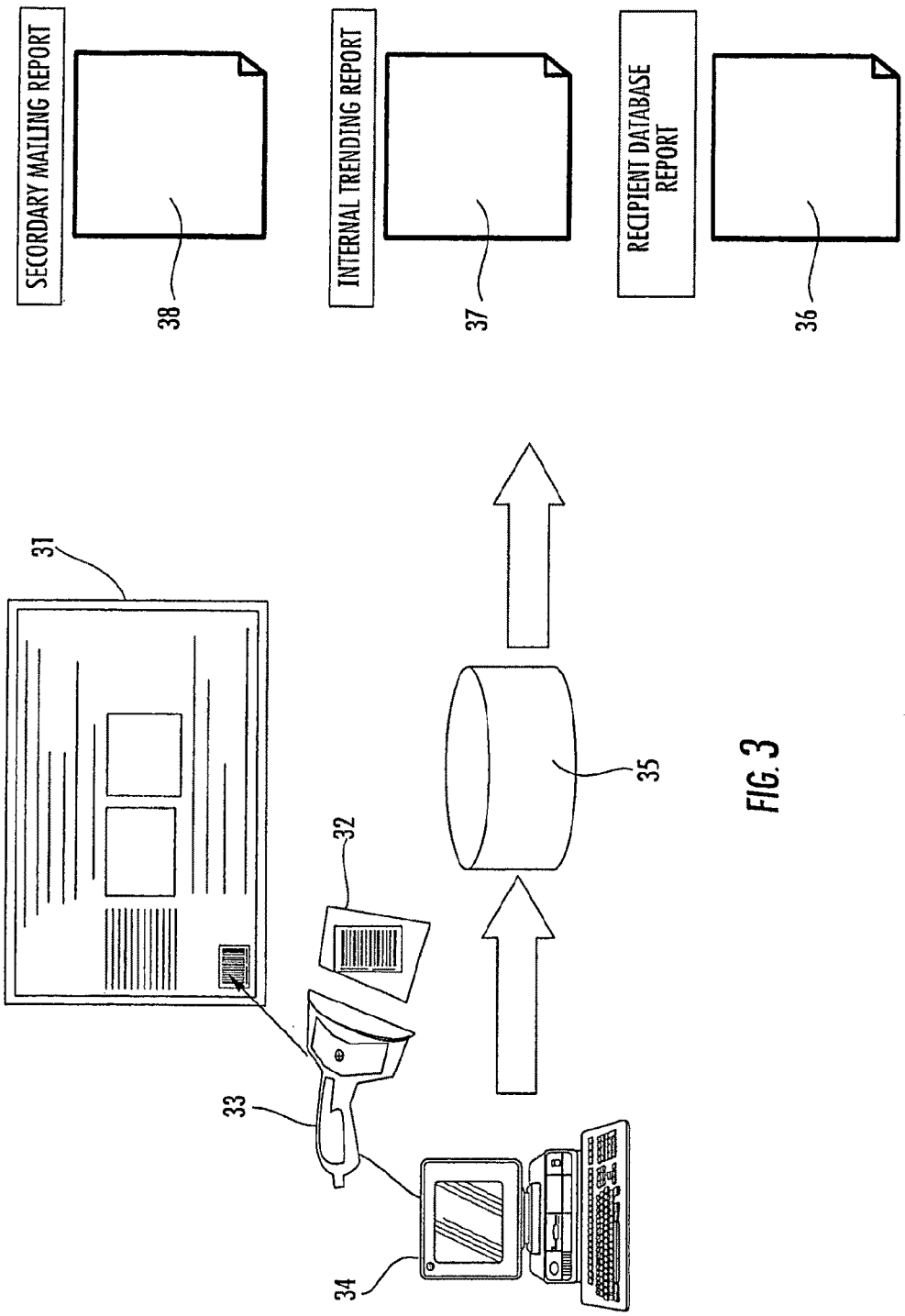
FIG. 3 is a further continuation of the flow diagrams provided in FIGS. 1 and 2.

Referring to FIG. 3, as Recipients redeem their direct mail Items 31 with respective Providers, the Items are collected by the Providers and sent (electronically, faxed, or mailed) to an internal clearinghouse where all Barcodes 32 are scanned using an appropriate reader 33. Once the Barcode 32 is scanned, an internal program 34 searches through a Central Database 35 which stores Records of all Recipients including information, such as household type (e.g., SFH or MFH), Recipient name and address, gender, age, and income level. The program 34 matches the scanned Barcode 32 with its associated Record. Using recipient information contained in the Record, one or more of several useful reports can be generated. For example, a Provider Database Report 36 contains demographics information for all Recipients who redeemed their direct mail Items with a particular Provider. An internal Trending Report 37 allows the System Administrator to track overall redemption of direct mail Items by subject matter or other classification criteria. A Secondary Mailing Report 38 creates a mailing list for Providers for sending subsequent promotions. These further promotions may be for complementary goods or services based on past Items redeemed by the Recipient. Using the valuable information contained in these and other reports generated from previous mailings to similarly situated Recipients, some Recipients of a targeted group may receive more or less Items, or even different but related Items.

In addition, either before or after generating the reports, the System Administration may contact and survey those Recipients who redeemed their direct mail Items. Survey questions may concern the quality of the Provider's goods or services, customer service, store location, hours of operation, parking convenience, and other matters of interest. Preferably, the survey is administered on-line at a web site maintained by the System Administrator.

Geo-Mapping Report

Figure 4:
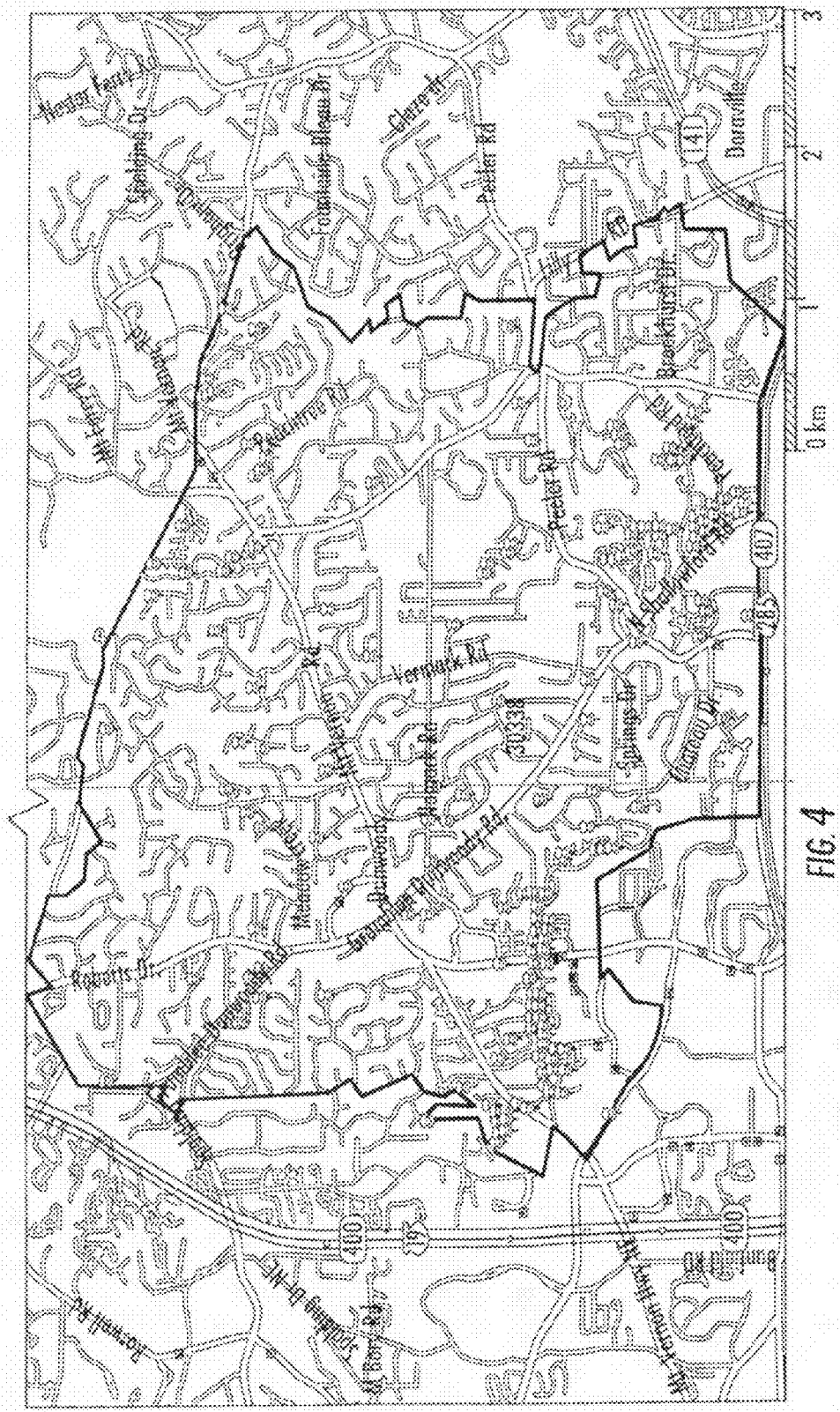
FIG. 4 is an example of a geographic map which plots locations of recipients who redeemed direct mail items of a provider.

FIG. 4 illustrates a further concept of the present invention—the electronic geographic mapping of a Provider's customer base (using recipient information contained in Records of the Central Database 35, as previously described). This "geo-mapping" report utilizes commercially-available mapping software to geographically plot the exact location (e.g., street address) of all Recipients who redeem items of the Provider. Preferably, customer segments are first defined based on demographic categories such as income level, age, gender, race, size of family, pet owners, and any other desired demographic. Other customer segmentation techniques are discussed below. Once defined, the different customer segments within the selected demographic category are then indicated simultaneously or separately at various points on the electronic map. Preferably, suitable coding (e.g., color coding, geometric shapes, etc.) is used to visually distinguish one customer segment from another.

The electronic map may also simultaneously display different customer segments within multiple demographic categories. For example, a Provider may wish to see its entire customer base segmented based on annual income level (e.g., $25 k-$50 k, $50 k-$75 k, $75 k-$100 k, and >$100 k), and at the same time see which customers are families of 3 or more. In this case, the map would visually display a first set of distinct points (e.g., circles) which would be color-coded based on income level, and second set of distinct points (e.g., triangles) which would be color-coded based on family size. The color-coded circles and triangles would be matched accordingly. An appropriate legend would also be provided at some location on the map. The geo-mapping report may be delivered to the Provider in any form, such as electronic or paper. The geo-map may also be accessible via a secure Internet website. This concept may also incorporate satellite imagery and other related technology.

By understanding which geographic areas are producing customers (or visitors), Providers can better understand their business and better service the consumers who are most likely to visit their location. For example, if through the geographic mapping feature of the present method a Provider determines that certain direct mail items are producing a number of new visitors from a specific neighborhood down the street, then it may be beneficial to send out a quick mailing or drop some information off in the neighborhood about the Provider's business. This feature promotes more effective use of marketing dollars, an understanding of driving patterns, and may also assist in determining locations for additional sites.

Customer Segmentation Report

The present method may also incorporate a more formal and comprehensive segmentation approach to more effectively report customer information to Providers. Customer segmentation, also referred to as market segmentation, is the practice of segmenting customers into groups of individuals with common characteristics. By gaining a better overall understanding of customers, then grouping them into categories, Providers are able to optimize marketing programs and more effectively allocate marketing dollars.

Traditional approaches to customer segmentation group customers based on a number of variables that include:

(i) geographic variables, such as specific regions, region size, or climate;

(ii) demographic variables, such as age, gender, family size, income, occupation, education, socioeconomic status, religion, nationality/race, and others;

(iii) psychographic variables, such as personality life-style, values, and attitudes; and (iv) behavioral variables, such as benefit sought, product usage rates, brand loyalty, product end use, readiness-to-buy stage, decision making unit, and others.

Customer segmentation is often performed with "clustering tools." Clustering is a computerized technique in which objects with similar properties are grouped together. Self Organizing Maps (SOM) is one example of a clustering technique known and used in the industry. This method is based on neural network and competitive learning techniques. An alternative segmentation approach is referred to in the industry as "Hotspot Profiling Analysis." Hotspot searches segments with highest (or lowest) responses (or performances). Hotspot profiling analysis drills-down data systematically and detects important relationships, co-factors, interactions, dependencies and associations amongst many variables and values accurately using Artificial Intelligence techniques such as incremental learning, and generate profiles of most interesting segments. This can be applied to customer data to find profiles of most (or least) responsive segments that can be used to develop marketing plans.

In one embodiment of the invention, the present method uses a customer segmentation approach developed by Claritas, Inc., and known commercially as PRIZM NE. PRIZM NE defines every household in terms of 66 demographically and behaviorally distinct types, or "segments," intended to help Providers learn more about customer likes, dislikes, lifestyles and purchase behavior. These 66 segments are grouped into three Lifestage Classifications based on the age of each segment's residents and the presence of children—two powerful predictors of consumer behavior. The Lifestage Classifications include the Younger Years, Family Life, and Mature Years.

The Younger Years consists of 22 segments where singles and couples are typically under 45 years old and child-free. (Younger Years residents may be too young to have kids or they're approaching middle age and chose not to have them). The second class, Family Life, is composed of 20 lifestyle types that all have high indexes for middle-aged adults and children. The final class, The Mature Years, comprises 24 segments, all residents who tend to be over 45 years old and childless. (Segments with high rates for both 50-year-old residents and children are included in Family Life.) Finally, within each of the three Lifestage Classifications, all the segments are sorted into 11 Lifestage Groups based on affluence—another powerful demographic predictor of consumer behavior.

The Lifestage Groups capture a combination of three variables—affluence, householder age and whether there are children living at home. This grouping is intended to help paint a more vivid picture of each segment's likely lifestyle. As an example, what the three Lifestage Groups that comprise "Younger Years" share is that all of those households are, for the most part, young and childless. Similarly, the four groups of segments that make up "Family Life" have children in common, while the four segments categorized as "Mature Years" are mostly empty nesters.

The customer segmentation report generated using the present method is based on information of all Recipients who redeem items of the Provider, as previously described. The report segments the customers according to the groups discussed above. Each customer is identified by one of the 66 segments, which segment falls into one of the 11 Lifestage Groups, which Lifestage Group falls within one of the three Lifestage Classifications.

Utilizing the customer segmentation report, the Provider can readily determine the type of lifestyle maintained by its best customers. This information can then be used to more effectively target marketing to similar lifestyle groups. For example, if most of a Provider's customers fall into a group whose main interest is country club sports, such as golf and tennis, then an effective marketing strategy may be to partner with a local golf or tennis club in an effort to get in front of those types consumers. Understanding the customer's lifestyle can also positively affect product selection or menu choices. For example, if a large percentage of customers fall into a lifestyle group which enjoys coffee bars, juice bars and microbrews, then it may be beneficial to add a line of fruit drinks or smoothies to a summer menu.

An example of a customer segmentation report according to one segmentation technique is provided below.

The geo-mapping and customer segmentation reports, discussed above, may be combined by representing Recipients of a Provider on the map using pre-defined visual codes unique to each of the 66 individual customer segments, 11 Lifestage Groups, and three Lifestage Classes. In this combined report, the geo-map could display the exact location and lifestyle type of the entire customer base in a single document. Alternatively, the combined report may comprise multiple maps which plot the locations of customers in each of the individual Lifestage Classes and/or Lifestage Groups.

All reports delivered to the Provider may be in any desired form (e.g., paper or electronic), and may be accessible via a secure Internet website.

A business method for promoting goods and services of providers is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

We claim:

1. A business method for promoting goods and services of providers, comprising:

designating a group of targeted direct mail recipients, said recipients comprising new residents having relocated from one zip code to a predetermined zip code;

dividing the new residents into segments according to segmentation criteria selected from a group consisting of anticipated needs of the new residents, past behavior of the new residents, and demographic profiles of the new residents;

generating a plurality of direct mail items comprising provider promotions;

using the segmentation criteria, preselecting from the plurality of direct mail items provider promotions relevant to each of the segments of new residents having relocated to the predetermined zip code;

marking each of the preselected direct mail items with a machine-readable ID code unique to each of the new residents, sorting the preselected direct mail items by their respective ID codes into cooperative mail packages, each mail package containing multiple items with common ID codes;

sorting the mail packages based on the number of direct mail items contained in each package, such that each package in a sorted group has an equal number of direct mail items;

forwarding the mail packages to respective new residents for redemption by the new residents;

after redemption of a direct mail item by a new resident, scanning the ID code using a reader and electronically linking it with the recipient's demographics information contained in the electronic database;

forwarding redeemed direct mail items to a clearinghouse for reading respective ID codes; and generating a report based on the direct mail items redeemed, said report comprising a geographic map which plots respective geographic locations of new residents, and said geographic map further comprising:

a first visual code feature, visually coding geographic location points on the geographic map to visually distinguish various segments of new residents based on a selected demographic; and a second visual code feature, further visually coding the geographic location points of new residents within the selected demographic based on a second selected demographic, such that new residents within the first selected demographic can be sub-segmented and visually distinguished on the geographic map; and said report further comprising:

a secondary mailing report containing demographics information for at least a portion of the targeted group for purposes of generating additional direct mail items; and a listing of new residents grouped into a plurality of demographics segments, said demographics segments comprising a plurality of lifestage classifications based on age and children.

* * * * *